United States Patent
Nishiura (10) Patent No.: US 8,401,361 B2
(45) Date of Patent: Mar. 19, 2013

(54) INFORMATION RECORDING AND REPRODUCING APPARATUS AND METHOD USING MENU OF FACE IMAGES INCLUDED IN RECORDING INFORMATION

(75) Inventor: Hiromi Nishiura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 819 days.

(21) Appl. No.: 12/430,206

(22) Filed: Apr. 27, 2009

(65) Prior Publication Data
US 2009/0310931 A1 Dec. 17, 2009

(30) Foreign Application Priority Data
Jun. 12, 2008 (JP) ................................ 2008-154688

(51) Int. Cl.
*H04N 5/765* (2006.01)
*H04N 5/931* (2006.01)

(52) U.S. Cl. ....................................... 386/200; 386/204

(58) Field of Classification Search .................. None
See application file for complete search history.

(56) References Cited

U.S. PATENT DOCUMENTS

| | | | |
|---|---|---|---|
| 2006/0271525 A1* | 11/2006 | Sukegawa | 707/3 |
| 2008/0131073 A1 | 6/2008 | Ogawa et al. | |
| 2008/0309777 A1* | 12/2008 | Aoyama | 348/222.1 |

FOREIGN PATENT DOCUMENTS

JP 2008-017042 1/2008

* cited by examiner

*Primary Examiner* — William C Vaughn, Jr.
*Assistant Examiner* — Oluwaseun A Adegeye
(74) *Attorney, Agent, or Firm* — Antonelli, Terry, Stout & Kraus, LLP.

(57) ABSTRACT

A signal processing portion successively accepts frames of images from video information recorded on a recording medium acting as a dubbing source. The medium is one of a hard disc drive and a disc medium. Then, the processing portion recognizes face images from the frames of image, displays the recognized face images on the screen of an LCD, registers face images selected from the displayed face images in response to a manipulation of control buttons, creates thumbnail images from images which are included in the registered face images and which have appeared at ratios in excess of 70%, extracts images including the thumbnail images from the recording medium acting as the dubbing source, and dubs the extracted images onto the recording medium acting as a dubbing destination.

10 Claims, 11 Drawing Sheets

INFORMATION RECORDING AND REPRODUCING APPARATUS AND METHOD USING MENU OF FACE IMAGES INCLUDED IN RECORDING INFORMATION

INCORPORATION BY REFERENCE

The present application claims priority from Japanese application JP2008-154688 filed on Jun. 12, 2008, the content of which is hereby incorporated by reference into this application.

BACKGROUND OF THE INVENTION

The present invention relates to information recording and reproducing apparatus and information recording method capable of recording and reproducing information to and from an information recording medium such as a hard disc drive (HDD).

In recent years, in the audio and video information environment, audio and video contents have been digitized. Furthermore, techniques for compressing audio and video data have improved. Consequently, a quick transition from tape recording typified by VTR to disc recording using DVD (digital versatile disc), hard disc drive, or the like is being made. One typical technique is a HDD-DVD hybrid recorder containing both a HDD and a DVD driver. This is used for dubbing. That is, video or audio information coming, for example, from a broadcast station or an external input terminal is once recorded on a HDD. If the user wants to preserve the information, the information is then recorded on a DVD disc by a backup process. A technique of enabling animated characters appearing in the content of the motion picture sequence and their positions to be offered to users in an appropriate and easily understandable manner has been proposed in US 2008/0131073 A1.

SUMMARY OF THE INVENTION

In the prior art, if plural persons or characters are present in the image, a menu screen is created to make it possible to check the scene behind each individual person. Although the user can select characters and their positions appearing in the contents of the motion picture sequence from the created menu screen, the convenience in use cannot be enhanced sufficiently.

Accordingly, it is an object of the present invention to provide information recording and reproducing apparatus and information recording method capable of offering a menu screen that can be used with improved convenience when dubbing is done based on face information.

This object is achieved in accordance with the teachings of the present invention by a method starting with recognizing face images from video information when a menu screen is created from the video information recorded on a recording medium that is a dubbing source. The recognized face images are displayed on a display screen. Face images selected based on user's manipulations are registered. Images including certain face images included in the registered face images are treated as thumbnail images. Images including the thumbnail images are extracted from the dubbing source and dubbed onto a recording medium that is a dubbing destination.

According to the invention, when dubbing is done based on face information, the convenience in use can be enhanced.

Other objects, features and advantages of the invention will become apparent from the following description of the embodiments of the invention taken in conjunction with the accompanying drawings.

DESCRIPTION OF THE INVENTION

Figure 1:
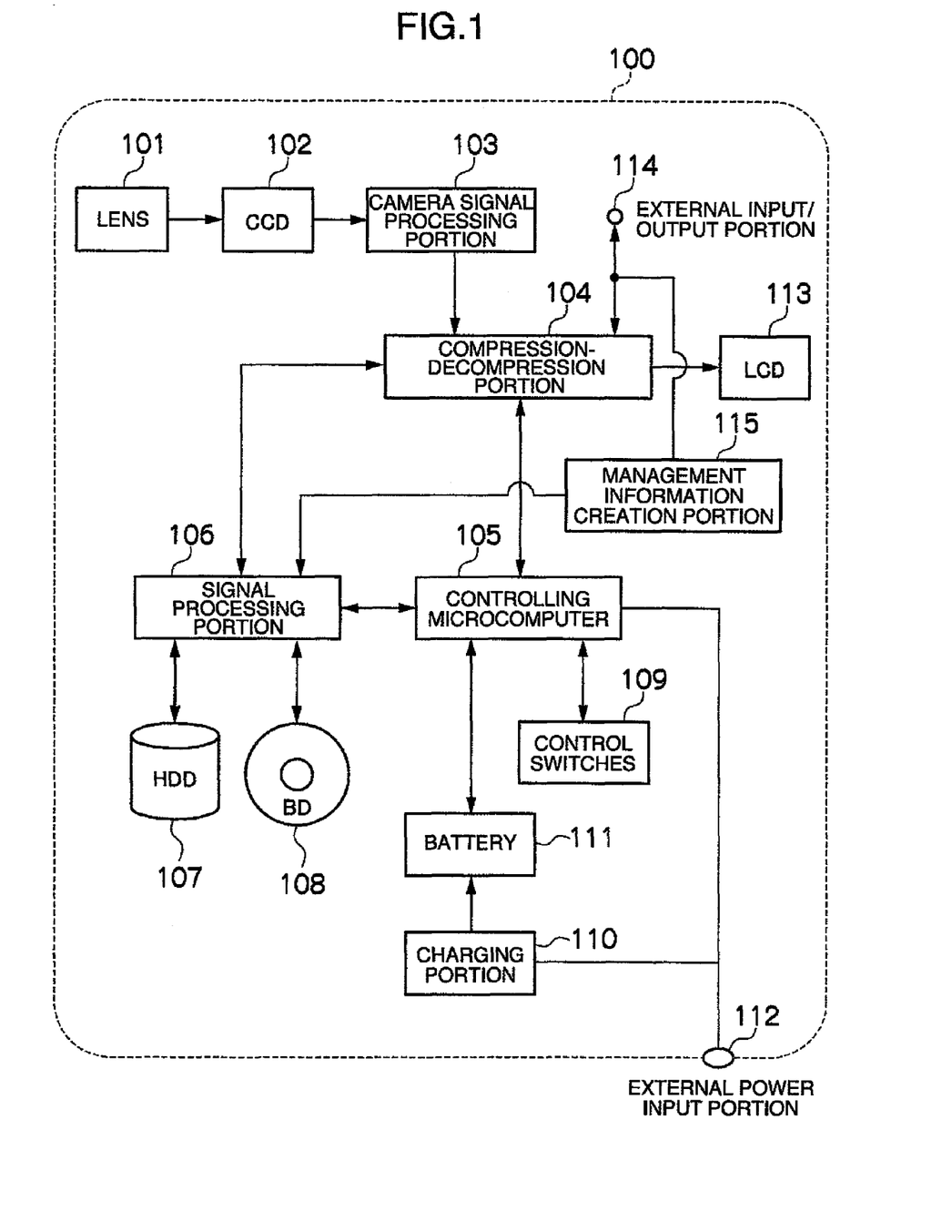
FIG. 1 is a block diagram of an information recording and reproducing apparatus showing one embodiment of the present invention.

Embodiments of the present invention are hereinafter described with reference to the drawings. FIG. 1 is a block diagram of an information recording and reproducing apparatus showing one embodiment of the invention.

Referring to FIG. 1, the information recording and reproducing apparatus, generally indicated by reference numeral 100, includes a BD (Blu-ray Disc) hybrid camera having a lens 101, an imaging sensor (CCD sensor) 102, a camera signal processing portion 103, a compression-decompression portion 104, a controlling microcomputer 105, a signal processing portion 106, a hard disc drive (HDD) 107, a disc medium (such as BD or DVD) 108, control switches 109, an electrical charging portion 110, a battery 111, an external power input portion 112, a liquid crystal display (LCD) 113, an external input-output interface (I/F) 114, and a management information creation portion 115.

The lens 101, imaging sensor (CCD sensor) 102, and camera signal processing portion 103 together form a camera portion that images a subject and creates a video signal representing video information. The signal processing portion 106 records the video signal from the camera signal processing portion 103 or video information (or video signal) from the outside onto a first recording medium and onto a second recording medium which consist of the hard disc drive (HDD) 107 and disc medium (such as BD or DVD) 108, respectively, or retrieves video information from the first and second recording media. The LCD 113 is formed as a display portion for displaying an image according to video information (video signal) produced by processing performed by the signal processing portion 106.

In particular, the information recording and reproducing apparatus 100 captures an image of the subject by the imaging sensor 102 via the lens 101, converts the image captured by the imaging sensor 102 into an electric signal, and converts the obtained electric signal into a video signal by the camera signal processing portion 103.

The video signal from the output of the camera signal processing portion 103 is converted into a digital video signal by the compression-decompression portion 104 that is under control of the controlling microcomputer 105. At this time, the externally applied video signal can also be converted into a digital video signal by the compression-decompression portion 104 by switching the activated input to the external input-output terminal 114.

The digital video signal is recorded as an image onto an external storage such as BD, DVD, or HDD by the signal processing portion 104. At this time, data is recorded on a recording medium such as a BD-R (Blu-ray Disc Recordable) disc formatted, for example, with UDF2.60. Where it is necessary to update the management information such as MD information or MDM information according to write-once recording of user data, the management information creation portion 115 creates management information, which in turn is recorded on the recording medium.

The control switches 109 act as an input portion for entering information for selecting images displayed on the screen of the LCD 113, and has control buttons (not shown) including direction buttons (up, down, left, and right) and an execution button. When the control switches 109 are operated by the user, control by the controlling microcomputer 105 is started. Then, video signals recorded on BD or DVD are read out by the signal processing portion 106 and recorded on the HDD. Consequently, dubbing between recording media can be carried out. Similarly, video signals recorded on the HDD can be read out and recorded onto the BD or DVD.

The signal recorded onto the external storage is decompressed into a video signal by the compression-decompression portion 104 and then outputted to the input-output terminal 114 and to the LCD 113. Consequently, an image responding to the video signal is displayed on the screen of the LCD 113. Other display device such as an organic EL display can be used instead of the LCD 113.

The apparatus has the external power input portion 112 as a power supply. When an external AC power supply is connected with it, AC power from the AC power supply is converted into DC power by the external power input portion 112. The produced DC power can be supplied to the charging portion 110 and to the controlling microcomputer 105. Because electric power is supplied from the external power input portion 112, the battery 111 can be charged by the charging portion 110.

Thus, when electric power is supplied from the external power input portion 112, devices can be activated by the external power supply. When no external power is supplied, the devices can be activated by the electric power supplied from the battery 111. Note that it is not necessary that all the functions necessary for electrical charging be incorporated in the apparatus. The apparatus may have some or all of the functions necessary for charging, in addition to the external power input portion 112.

If the electric power is supplied from the external power input portion 112, the controlling microcomputer 105 acts as a control portion that instructs the signal processing portion 106 to perform dubbing onto the first and second recording media consisting of the hard disc drive (HDD) 107 and disc medium 108, respectively.

Figure 2:
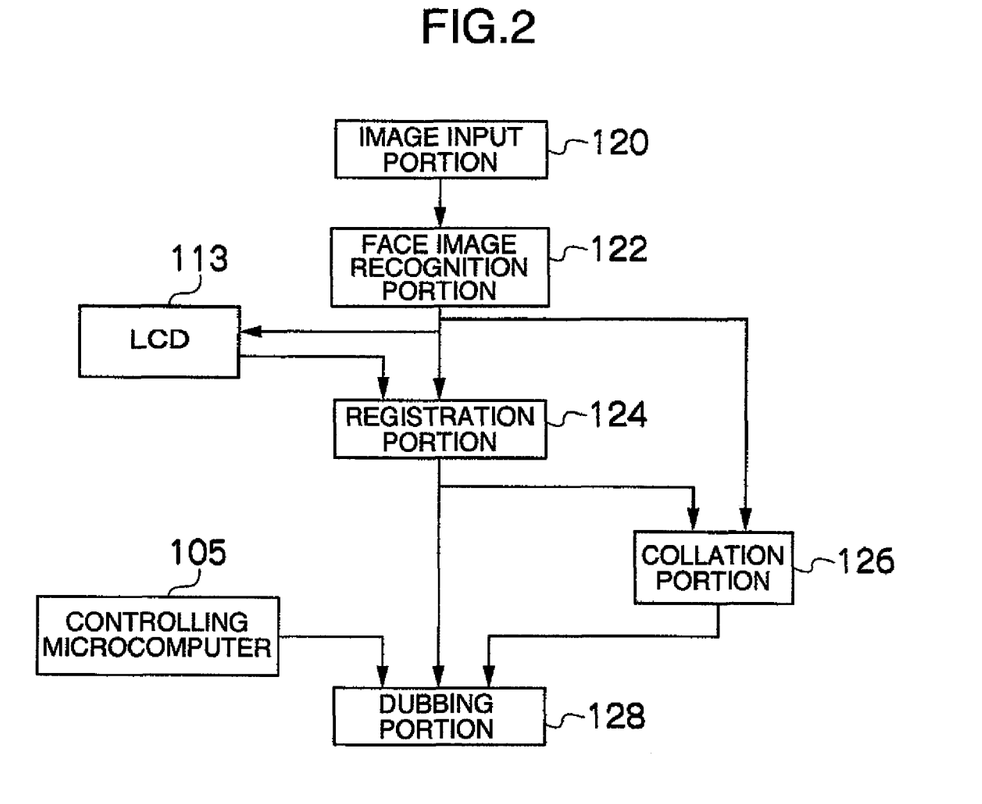
FIG. 2 is a functional block diagram of a signal processing portion included in the apparatus shown in FIG. 1.

As shown in FIG. 2, the signal processing portion 106 has functions serving as an image input portion 120, a face image recognition portion 122, a registration portion 124, a collation portion 126, and a dubbing portion 128. The image input portion 120 successively accepts frames of images from the video information recorded on the recording medium which is one of the hard disc drive (HDD) 107 and disc medium 108 and which acts as a dubbing source. The image recognition portion 122 analyzes image data about the frames of images accepted by the image input portion 120, recognizes (detects) face images, and displays the recognized face images on the LCD 113. Face images are selected based on manipulation of the control switches 109 from the face images displayed on the screen of the LCD 113. The registration portion 124 registers the selected face images into its memory. The collation portion 126 collates the face image registered in the memory by the registration portion 124 against face images extracted by the face image recognition portion 122. When the controlling microcomputer 105 issues an instruction for a dubbing operation, the dubbing portion 128 refers to the result of the collation performed by the collation portion 126, extracts certain face images (e.g., images including face images of persons a, b, and c) as thumbnail images from 10 face images registered in the memory (i.e., from the recording medium acting as the dubbing source), and dubs the extracted images onto the recording medium that is the dubbing destination. The thumbnail images provide indexes in extracting face images from the recording medium acting as the dubbing source.

Figure 3:
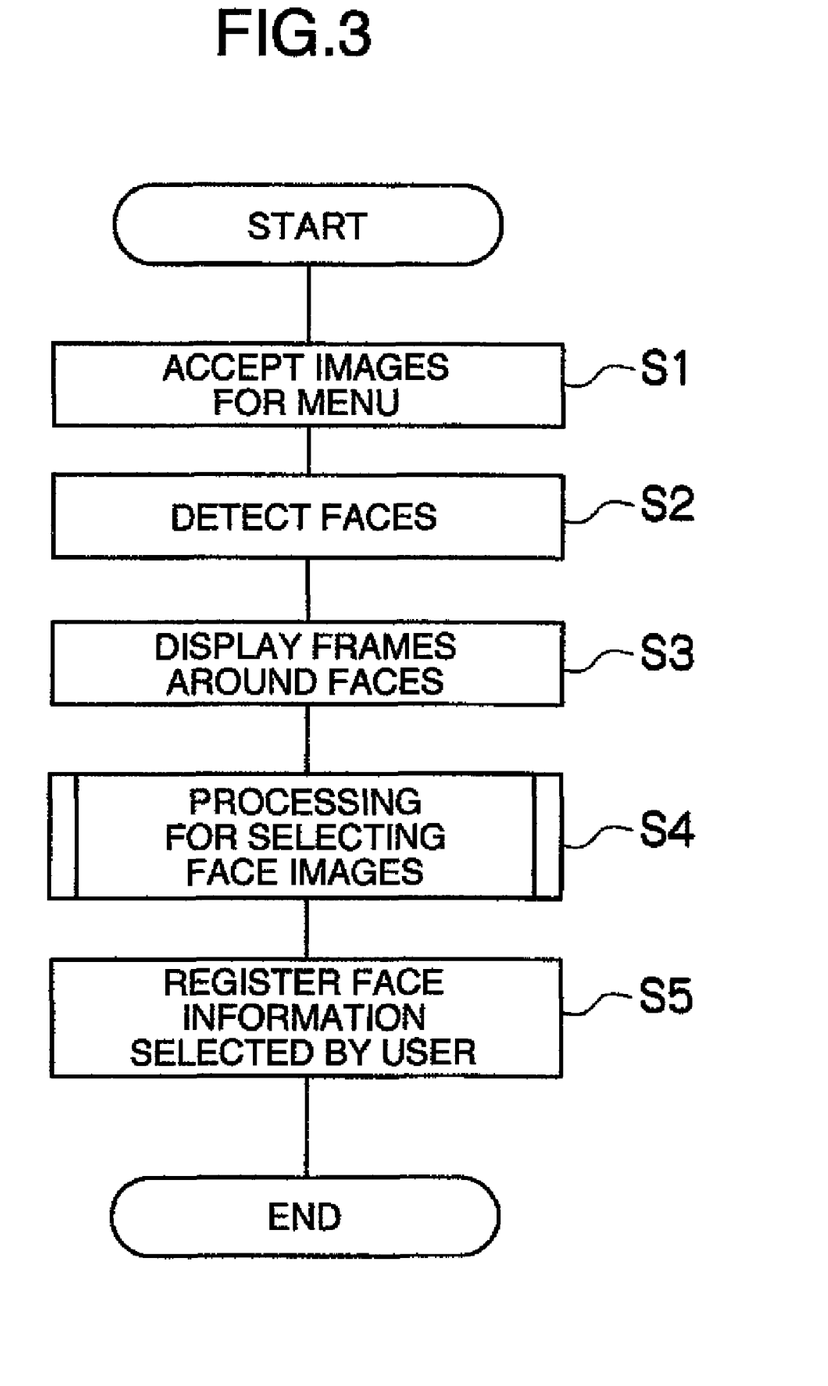
FIG. 3 is a flowchart illustrating processing (routine) for registering face images.

The operation of the present embodiment is next described by referring to the flowchart of FIG. 3. Prior to execution of the dubbing operation, the signal processing portion 106 successively accepts frames of images as images for a menu from the video information recorded on the dubbing source (S1). The signal processing portion 106 detects (recognizes) the face images in the accepted frames of images, and displays the detected face images on the screen of the LCD 113 (S2).

Figure 4A:
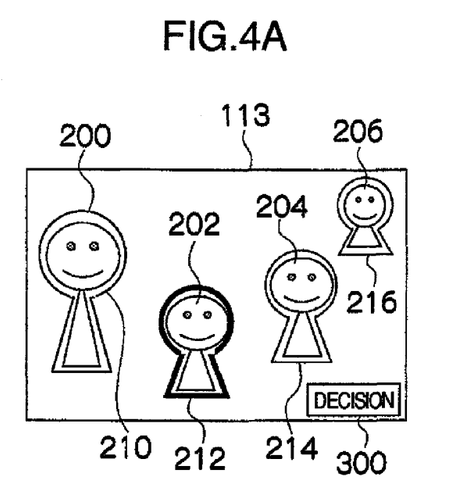
FIGS. 4A-4D show examples of menu screen presented to prompt a user to select face images.

For example, as shown in FIG. 4A, when face images of four persons are detected from the frames of images, face images 200, 202, 204, and 206 are displayed on the screen of the LCD 113. Then, the signal processing portion 106 displays frames 210, 212, 214, and 216 around the displayed face images 200, 202, 204, and 206, respectively (S3).

Then, the signal processing portion 106 waits until the processing performed by the user to select face images is completed (S4). Subsequently, the processing portion registers the face images selected by the user (S5), thus terminating the processing of this routine.

Figure 5:
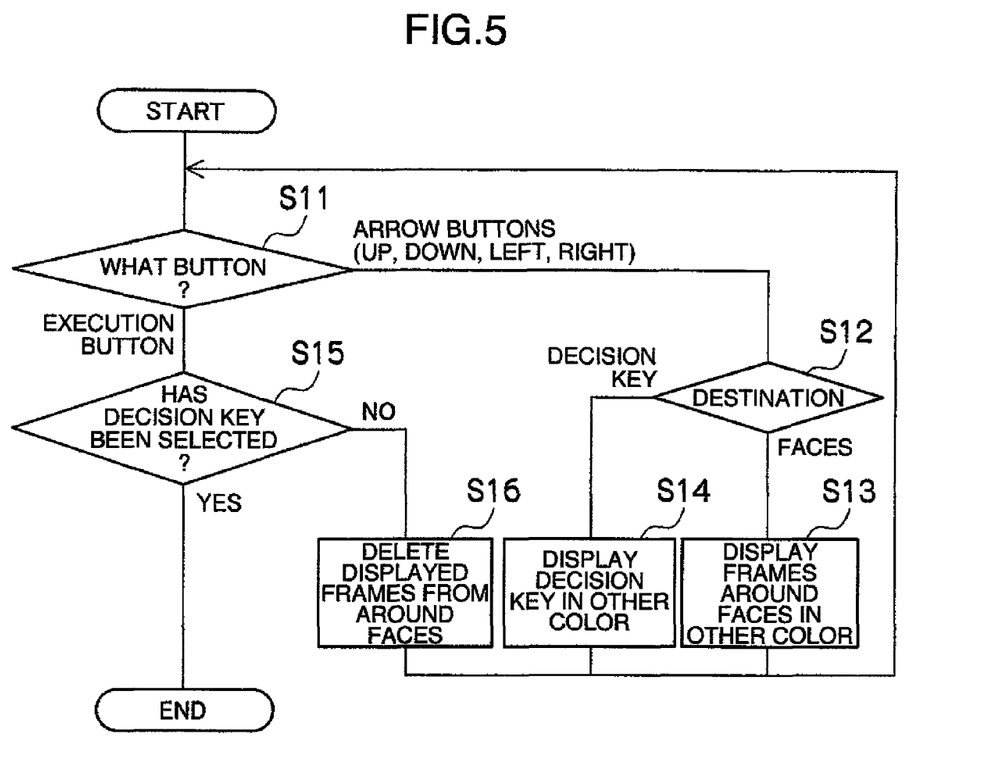
FIG. 5 is a flowchart illustrating processing (routine) for determining face images based on user's manipulations.

The processing performed by the user to select face images is next described by referring to the flowchart of FIG. 5. When a user's manipulation to select face images is started, the signal processing portion 106 determines which one of the arrow buttons (up, down, left, right) and execution button has been operated by the user (S11). When any one of the arrow buttons has been operated, the processing portion makes a decision as to whether the destination is a face or the execution button (S12). If the destination is a face, the face frame is displayed in other color (S13).

Figure 4B:
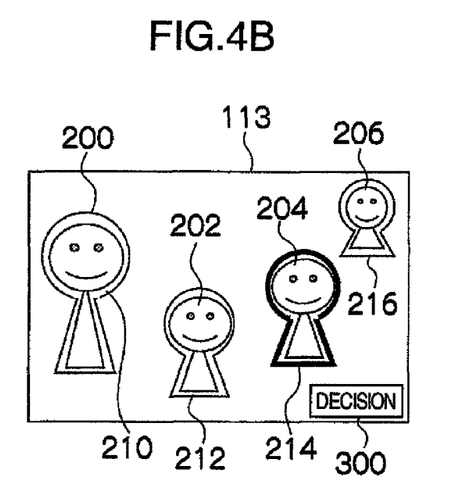
Figure 4C:
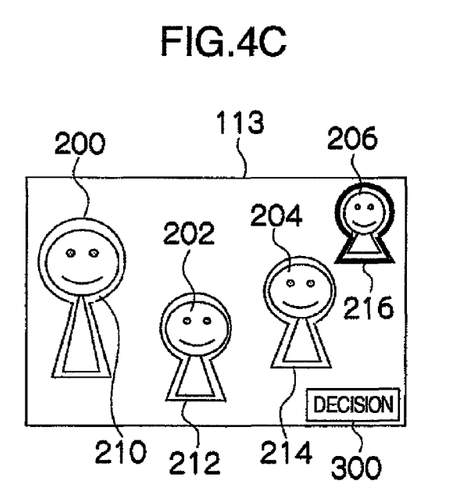

For example, if the destination indicated by the operated one of the arrow buttons (up, down, left, right) is the face image 202 as shown in FIG. 4A, the frame 212 is displayed in a color different from the color of the face image 202. If the destination is the face image 204 as shown in FIG. 4B, the frame 214 is displayed in other color. If the destination is the face image 206 as shown in FIG. 4C, the frame 216 is displayed in other color.

On the other hand, if the user operates the decision key 300 on the screen after an operation for selecting face images is executed, the signal processing portion 106 determines that the destination is the decision key 300 (step S12) and displays the decision key 300 in other color (S14).

Figure 4D:
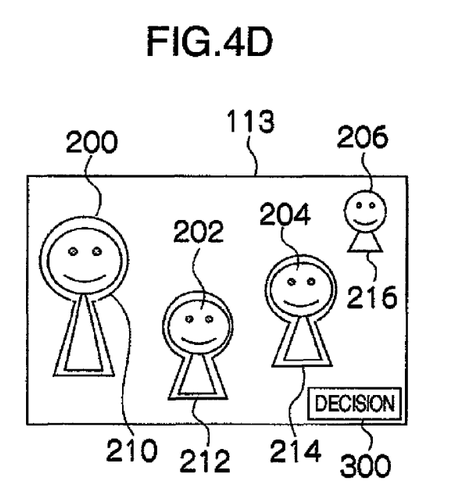

If the execution button is operated by the user after the operation performed by the user to select face images is determined, the signal processing portion 106 makes a transition from step S11 to step S15, in which a decision is made as to whether or not the decision key 300 has been selected. If the decision key 300 is not selected, the displayed frame 216 around the face image 206 is deleted (S16) as shown in FIG. 4D. Program control goes back to the processing of step S11. Then, if the execution button is operated by the user and if the decision key 300 is selected, the signal processing portion 106 determines that all operations performed by the user to select face images are completed, and terminates the processing of this routine.

Figure 6:
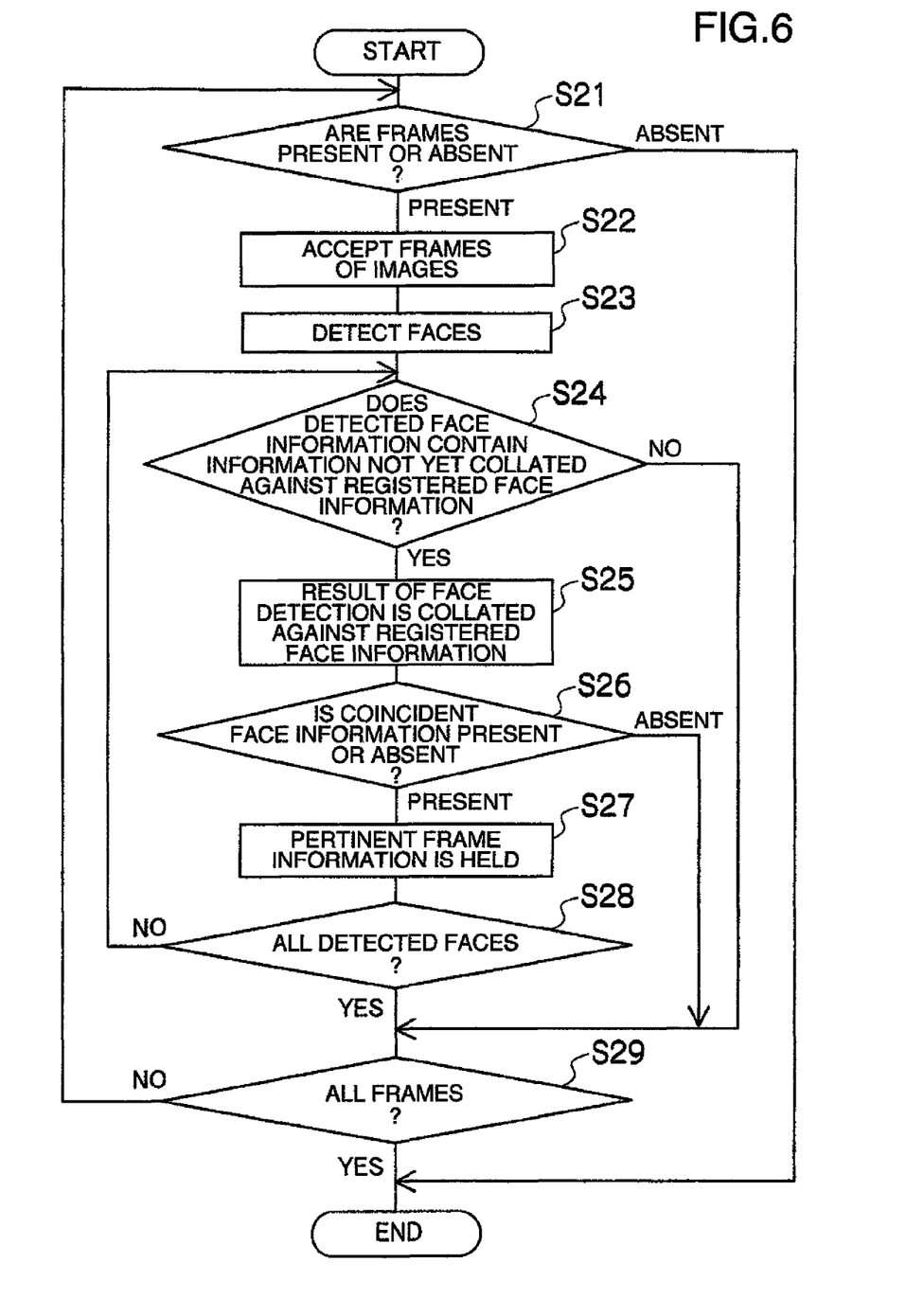
FIG. 6 is a flowchart illustrating a sequence of operations performed during recording of face images.

A sequence of operations performed during recording to register the face images selected by the user is next described by referring to the flowchart of FIG. 6.

The signal processing portion 106 accepts the video signal from the recording medium, makes a decision as to whether there are frames (S21), and terminates the processing of the routine if there are no frames. If there are frames, the frames of images are accepted (S22). The signal processing portion detects (recognizes) face images from the accepted frames of images (S23) and makes a decision as to whether information about the detected faces contains information not yet collated against the registered face information (S24). If the decision at this step is negative (NO), the processing of the routine is terminated. If the decision at this step is affirmative (YES), the result of the detected faces is collated against the registered face information (S25).

Thereafter, the signal processing portion 106 makes a decision as to whether or not there is coincident face information (S26). If the decision at this step is NO (i.e., there is no coincident face information), the processing of this routine is terminated. If the decision is YES, the frame information is held (S27). A decision is made as to whether processing about every detected face is completed (S28). If the processing about every detected face is not completed, program control returns to the processing of step S24. If the processing about every detected face is completed, a decision is made as to whether the processing about all the frames is completed (S29). If the processing about all the frames is not completed, the processing of steps S21-S29 is repeated. If the processing about all the frames is completed, the processing of this routine is terminated.

Figure 7:
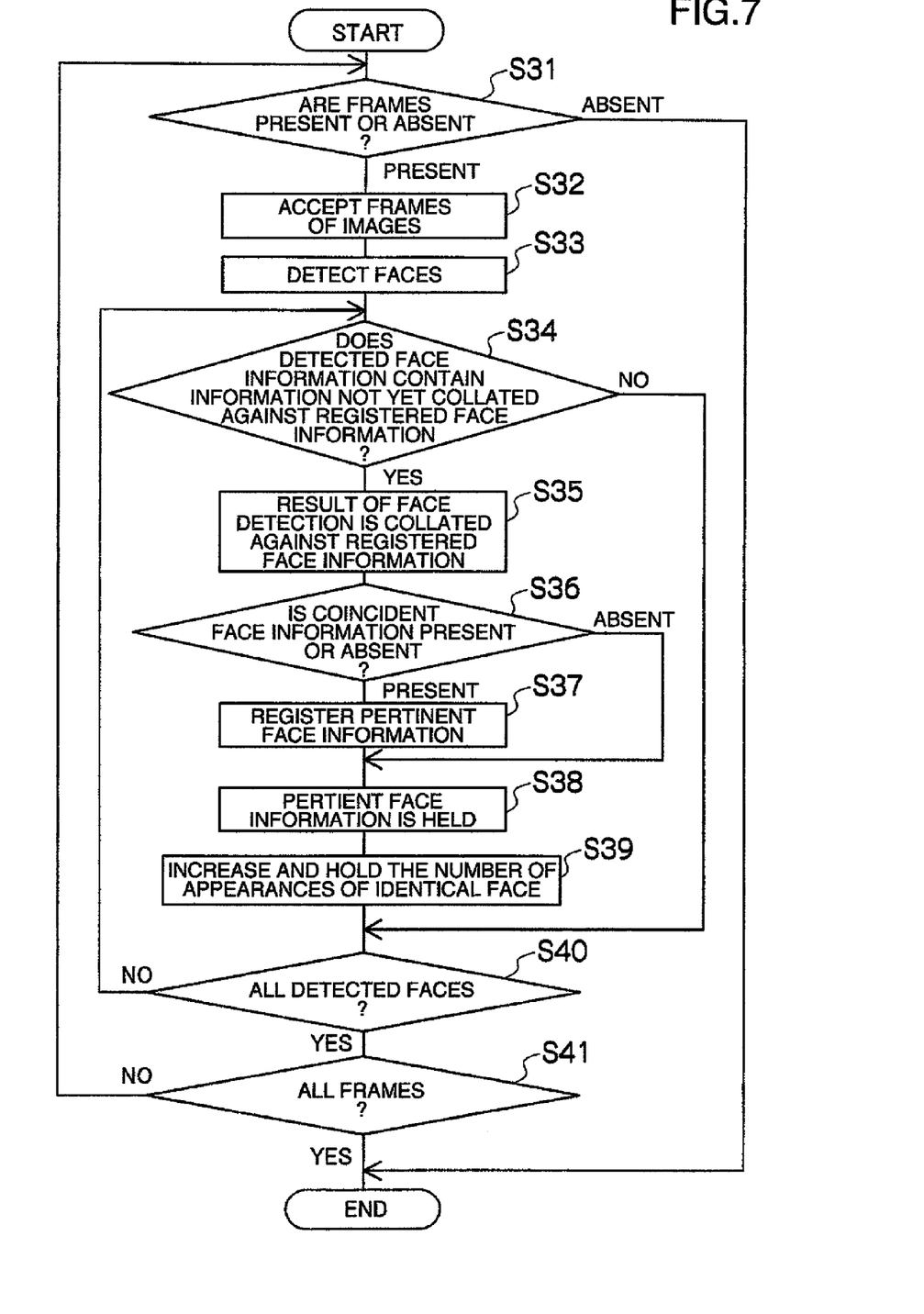
FIG. 7 is a flowchart illustrating another sequence of operations performed during recording of face images.

The processing of the recording sequence is next described by referring to the flowchart of FIG. 7. First, the signal processing portion 106 successively accepts frames of images from the video information and makes a decision as to whether there are frames (S31). If there are no frames, the processing of this routine is terminated. If there are frames, frames of images are accepted (S32). Face images are detected from the accepted frames of images (S33). A decision is made as to whether the detected face information (face images) contains information not yet collated against the registered face information (S34).

If the decision at this step is affirmative to indicate that there is no uncollated information, the signal processing portion 106 terminates the processing of this routine. If the decision is negative to indicate that there is uncollated information, the signal processing portion 106 collates the result of the face detection against the registered face information (S35). A decision is made as to whether there is coincident face information (S36). If there is no coincident face information, the collated face information is registered (S37). If there is coincident face information, the frame information is held (S38). The number of appearances of the same face information is increased. Information about the frame having the increased rate of appearance is held (S39).

Then, the signal processing portion 106 makes a decision as to whether the processing about all the detected faces is completed (S40). If the processing of all the detected faces is not completed, program control returns to the processing of step S34. If the processing about all the detected faces is completed, a decision is made as to whether processing about all the frames is completed (S41). If the processing about all the frames is not completed, the processing of steps S31-S40 is repeated. If the processing about all the frame is completed, the processing of this routine is terminated.

Figure 8:
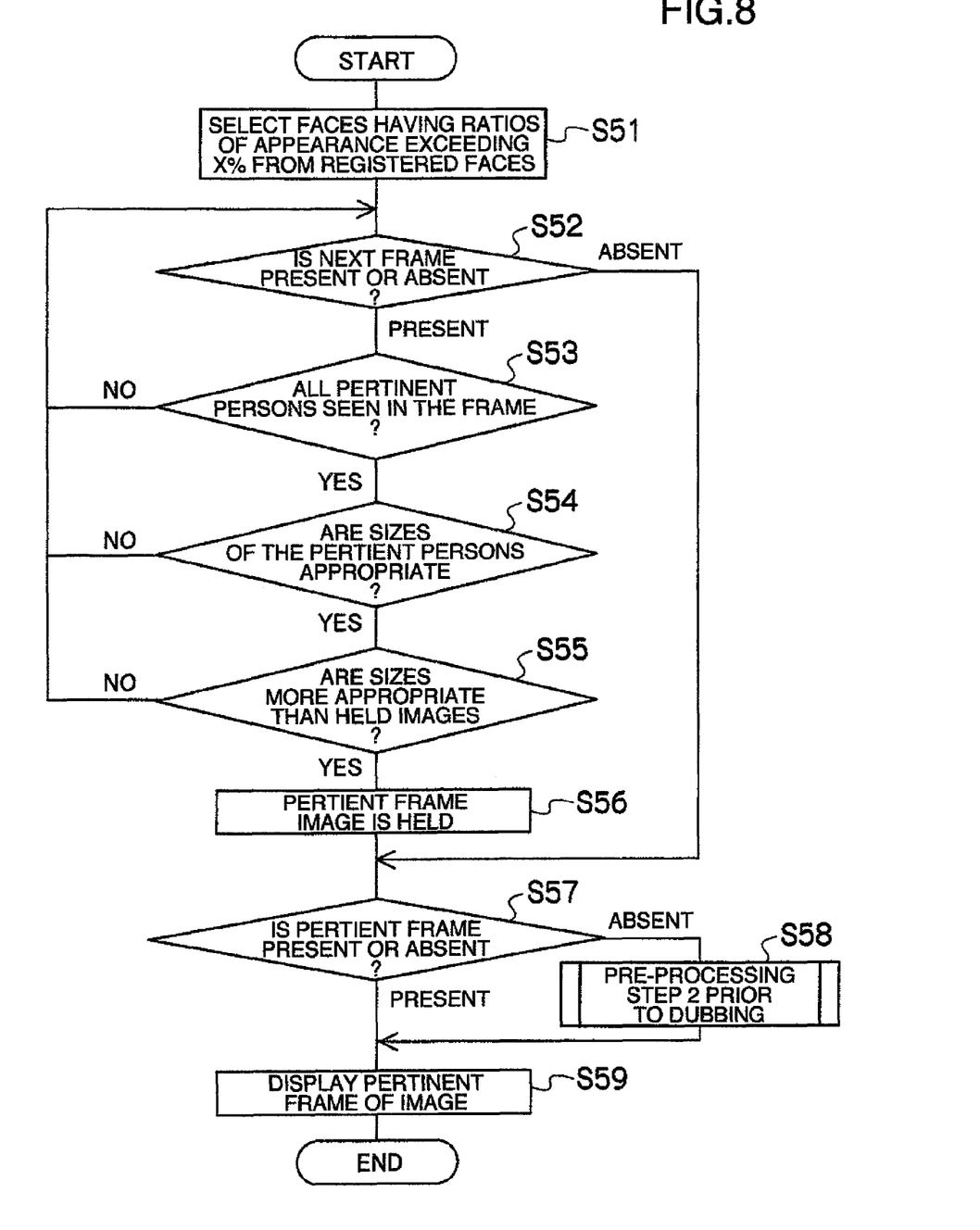
FIG. 8 is a flowchart illustrating pre-processing step 1 performed prior to dubbing.

The operation of the pre-processing step 1 performed prior to dubbing is next described by referring to the flowchart of FIG. 8. First, the signal processing portion 106 selects images having ratios of appearance in excess of X % are selected from the registered face images (S51). That is, the signal processing portion 106 records the face images while linking them to the ratios of appearance (%) to the total number of frames of images and selects each face image having a recorded ratio of appearance exceeding X %.

Figure 9:
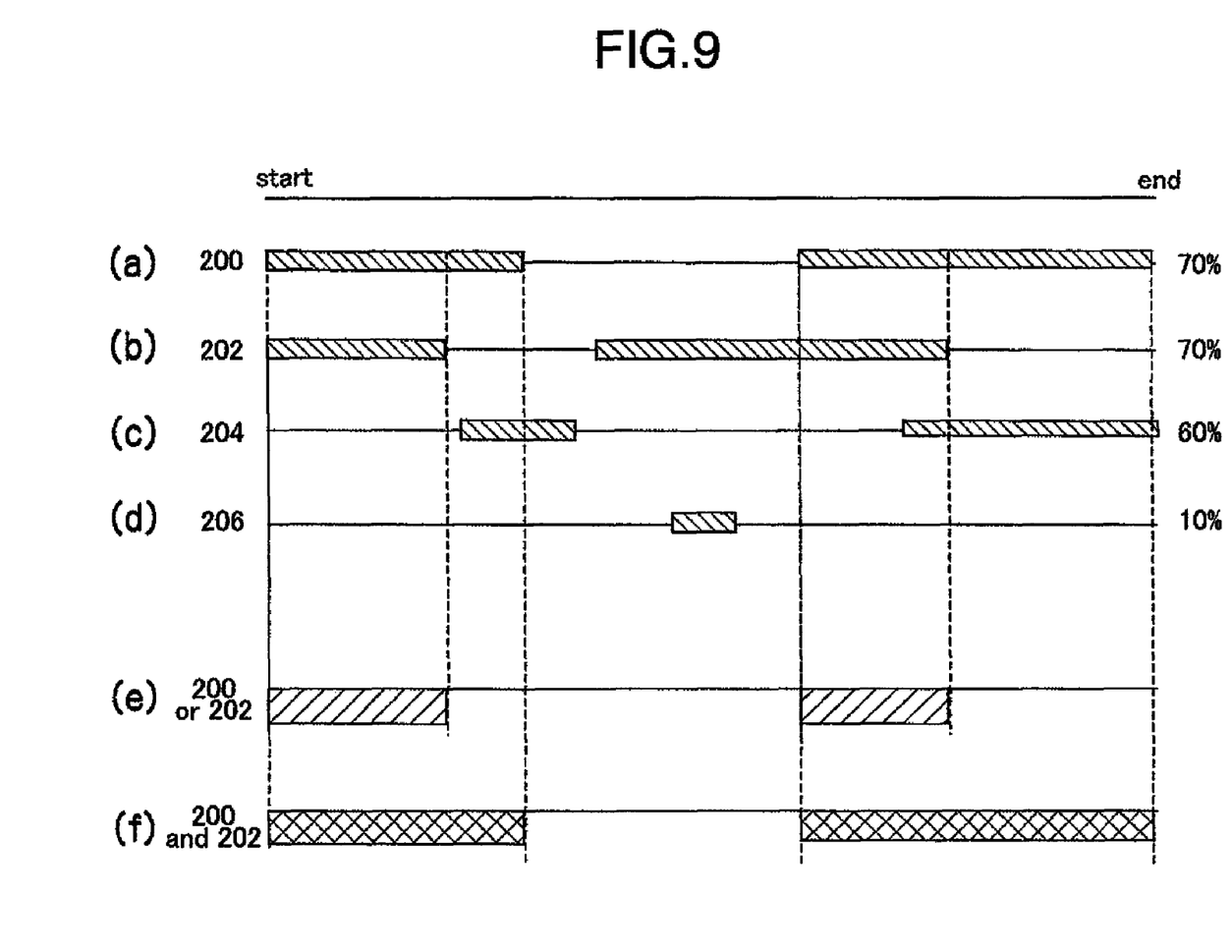
FIG. 9 is a graph illustrating an example of registration of the number of appearing face images.

For example, as shown in (a)-(d) of FIG. 9, the signal processing portion 106 records the face images 200, 202, 204, and 206 while linking them to their respective ratios of appearance (%). As shown in (e) of FIG. 9, the signal processing portion records the face images while linking them to the ratio of appearance of either the face image 200 or face image 202. As shown in (f) of FIG. 9, the signal processing portion records the face images while linking them to the ratios of appearance of the face images 200 and 202. When face images having ratios of appearance in excess of a preset value X % (e.g., 70%) are selected from the registered face images, the face images 200 and 202 are selected from the face images 200, 202, 204, and 206.

Then, the signal processing portion 106 makes a decision as to whether there is a next frame (S52). If there is a next frame, a decision is made as to whether the pertinent persons are all seen in the frame of image (S53). If the decision is negative, program control returns to the processing of step S52. If the decision is affirmative (YES), a decision is made as to whether the sizes of the persons are appropriate (S54). If the sizes are not appropriate, program control returns to the processing of step S52. If the sizes of the persons are judged to be appropriate, a decision is made as to whether the sizes are more appropriate than the held images (S55). If the sizes are not appropriate, program control returns to the processing of step S52.

If the sizes are judged to be appropriate in step S55, the signal processing portion 106 holds the frames of images (S56). A decision is made as to whether there is the frame (S57), in the same way as when the result of the decision at step S52 is that there is no next frame. If the decision is that there is not the frame, program control proceeds to the processing of step S58 (pre-processing step 2 of FIG. 10 performed prior to dubbing). If the decision is that there is the frame, the frame of image is displayed (S59). The processing of this routine is terminated.

Figure 10:
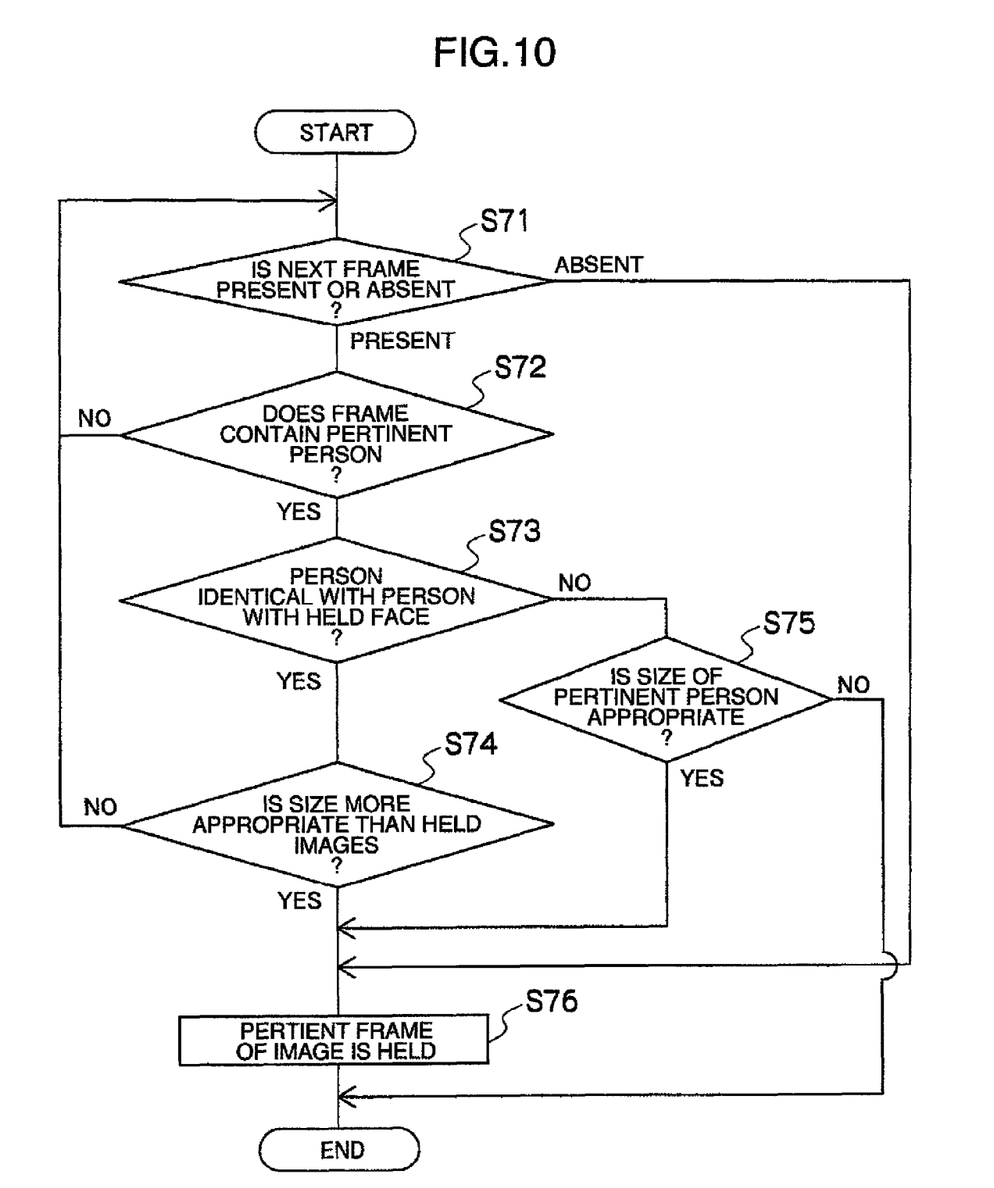
FIG. 10 is a flowchart illustrating pre-processing step 2 performed prior to dubbing.

The pre-processing step 2 performed prior to dubbing is next described in detail by referring to the flowchart of FIG. 10. First, the signal processing portion 106 makes a decision as to whether or not there is a next frame (S71). If the decision is that there is a next frame, a decision is made as to whether the pertinent person is seen in the frame (S72). If the decision is that there is not any image in which the pertinent person is seen, program control returns to the processing of step S71. If there is any frame in which the pertinent person is present, a decision is made as to whether the face of the person is identical with the held face. If the decision at this step is that the face of the person is identical with the held face, a decision is made as to whether the size is more appropriate than the held image (S74). If the size is less appropriate than the held image, program control returns to the processing of step S71. If the decision is that the size is more appropriate than the held image, program control goes to the processing of step S76.

If the decision at step S73 is that the person is not identical with the person having the held face, the signal processing portion 106 makes a decision as to whether or not the size of the person is appropriate (S75). If the size of the person is not appropriate, the processing of this routine is terminated. If the size of the person is appropriate, the frame of image is held (S76). Then, the processing of this routine is terminated.

Figure 11:
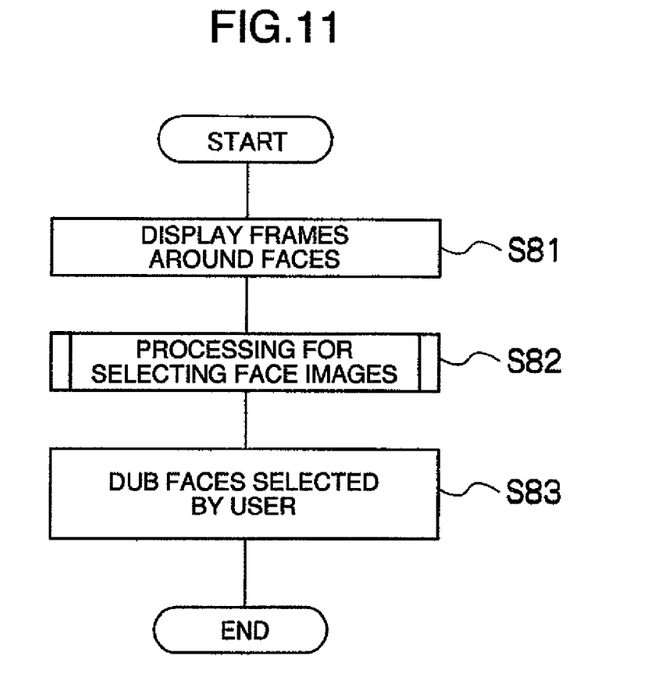
FIG. 11 is a flowchart illustrating processing (routine) for performing dubbing.

Processing for carrying out the dubbing is next described by referring to the flowchart of FIG. 11. First, the signal processing portion 106 displays frames 210, 212, 214, and 216 around the face images 200, 202, 204, and 206, respectively, displayed on the screen of the LCD 113 (S81) and performs operations responsive to a user's operation to make a choice (S82). The processing is similar to the processing illustrated in FIG. 5. The signal processing portion waits until an operation performed by the user to select face images is completed. After the end of the operation, the face images selected by the user are dubbed (S83). That is, images including the face images recorded on the recording medium acting as a dubbing source are extracted as thumbnail images from the dubbing source and dubbed onto the recording medium acting as a dubbing destination. The processing of this routine is terminated.

Figure 12:
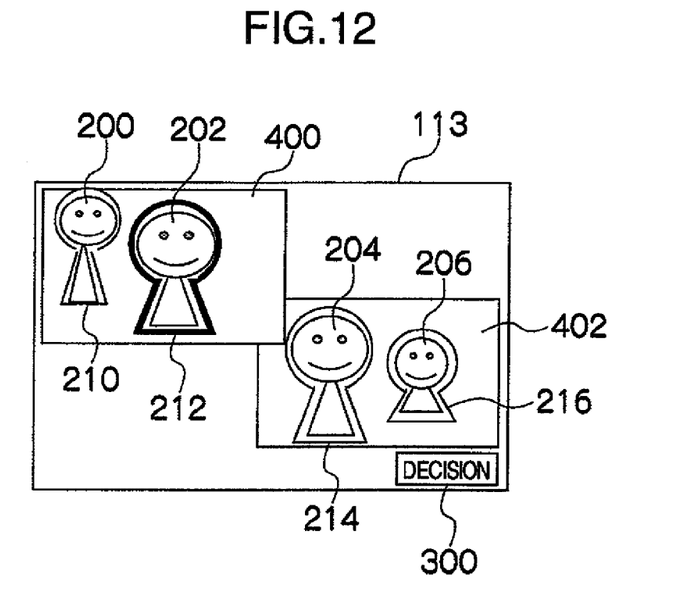
FIG. 12 illustrates one method of displaying two menu screens.

FIG. 12 shows an example of display provided on the screen of the LCD 113 when two menu screens are displayed to prompt a user to select face images. In this case, face images 200 and 202 are displayed in one menu screen 400. Face images 204 and 206 are displayed in the other menu screen 402. Frames 210, 212, 214, and 216 can be displayed around the face images 200, 202, 204, and 206, respectively.

According to the present embodiment, during dubbing, the signal processing portion 106 successively accepts frames of images from the video information recorded on the recording medium which is selected from the hard disc drive 107 and disc medium 108 and which acts as a dubbing source, recognizes face images from the frames of images, and displays the recognized face images on the screen of the LCD 113. A user operates the control switches 109 to select face images from the displayed face images. The signal processing portion registers the selected face images. Thumbnail images are created (a) from those of the registered face images which have ratios of appearance exceeding a preset value, (b) from images including identical face images of plural persons, or (c) from images including all of the registered face images. The signal processing portion extracts images including the thumbnail images from the recording medium acting as the dubbing source and dubs the extracted images onto the recording medium acting as the dubbing destination. Consequently, when dubbing is done based on face information, the convenience in use for the user can be enhanced.

Where there is not any frame of image or scene where all of the persons of interest are present, the frame of image can be divided and displayed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information recording and reproducing apparatus comprising:
a camera portion for creating video information by imaging a subject;
a signal processing portion for recording video information from the camera portion or from the outside onto first and second recording media, or reading the video information from the first and second recording media;
a display portion on which images represented by the video information are displayed;
an input portion for entering information for selecting images from the images displayed on the display portion; and
a control portion for controlling all of these portions;
wherein said signal processing portion accepts video information recorded on one of the first and second recording media that acts as a dubbing source, recognizes face images from the accepted video information, displays the recognized face images on the display portion, registers face images selected from the face images displayed on the display portion according to the information entered from the input portion, makes a first decision on a basis of the registered face images as to whether sizes of face images selected from the video information are appropriate when a dubbing instruction is given from the control portion, omits the video information when a result of the first decision is that the sizes of the face images are not appropriate, makes a second decision as to whether the sizes are more appropriate than a held image when the result of the first decision is that the sizes are appropriate, makes thumbnail images from images including the face images when the second decision is that the sizes are appropriate, extracts the images including the thumbnail images from the dubbing source, and executes processing for dubbing the extracted images onto the other of the first and second recording media that acts as a dubbing destination.

2. An information recording and reproducing apparatus as set forth in claim 1, wherein said signal processing portion successively accepts frames of images from the video information recorded on the recording medium acting as the dubbing source, and recognizes face images from the accepted frames of images.

3. An information recording and reproducing apparatus as set forth in claim 1, wherein said signal processing portion successively accepts frames of images from the video information recorded on the recording medium acting as the dubbing source, recognizes face images from the accepted frames of images, displays the recognized face images on the display portion, registers face images selected from the face images displayed on the display portion according to the information entered from the input portion, and creates thumbnail images from images including all of the registered face images when a dubbing instruction is given from the control portion.

4. An information recording and reproducing apparatus as set forth in claim 1, wherein said signal processing portion successively accepts frames of images from the video information recorded on the recording medium acting as the dubbing source, recognizes face images from the accepted frames of images, displays the recognized face images on the display portion, registers face images selected from the face images displayed on the display portion according to the information entered from the input portion, and creates thumbnail images from images including identical face images of the registered face images when a dubbing instruction is given from the control portion.

5. An information recording and reproducing apparatus as set forth in claim 1, wherein said signal processing portion successively accepts frames of images from the video information recorded on the recording medium acting as the dubbing source, recognizes face images from the accepted frames of images, displays the recognized face images on the display portion, registers face images selected from the face images displayed on the display portion according to the information entered from the input portion, and creates thumbnail images from images including face images which are included in the registered face images and which have appeared as said frames of images at ratios of appearance in excess of a preset value when a dubbing instruction is given from the control portion.

6. A method of recording information using an information recording and reproducing apparatus having a camera portion for creating video information by imaging a subject, a signal processing portion for recording video information from the camera portion or from the outside onto first and second recording media or reading the video information from the first and second recording media, a display portion on which images represented by the video information are displayed, an input portion for entering information for selecting images from the images displayed on the display portion, and a control portion for controlling all of these portions, said method comprising:
  (i) causing the signal processing portion to accept video information recorded on one of the first and second recording media that acts as a dubbing source;
  (ii) recognizing face images from the accepted video information by the signal processing portion;
  (iii) displaying the recognized face images on the display portion under control of the signal processing portion;
  (iv) causing face images selected from the face images displayed on the display portion to be registered into the signal processing portion according to the information entered from the input portion; and
  (v) making a first decision on a basis of the registered face images as to whether sizes of face images selected from the video information are appropriate when a dubbing instruction is given, omitting the video information when a result of the first decision is that the sizes of the face images are not appropriate, making a second decision as to whether the sizes are more appropriate than a held image when the result of the first decision is that the sizes are appropriate, making thumbnail images from images including the face images when the second decision is that the sizes are appropriate, extracting the images including the thumbnail images from the dubbing source, and executing processing for dubbing the extracted images onto the other of the first and second recording media that acts as a dubbing destination.

7. A method of recording information as set forth in claim 6, wherein in the operation (i), said signal processing portion successively accepts frames of images from the video information recorded on the recording medium acting as the dubbing source, and wherein in the operation (ii), said signal processing portion recognizes face images from the frames of images.

8. A method of recording information as set forth in claim 6, wherein said signal processing portion successively accepts frames of images from the video information recorded on the recording medium acting as the dubbing source in the operation (i), recognizes face images from the frames of images in the operation (ii), displays the recognized face images on the display portion in the step (iii), registers face images which are selected from the face images displayed on the display portion according to the information entered from the input portion in the operation (iv), and creates thumbnail images from images including all of the registered face images when a dubbing instruction is given from the control portion in the operation (v).

9. A method of recording information as set forth in claim 6, wherein said signal processing portion successively accepts frames of images from the video information recorded on the recording medium acting as the dubbing source in the operation (i), recognizes face images from the frames of images in the operation (ii), displays the recognized face images on the display portion in the operation (iii), registers face images which are selected from the face images displayed on the display according to the information entered from the input portion in the step (iv), and creates thumbnail images from images including identical face images of the registered face images when a dubbing instruction is given from the control portion in the operation (v).

10. A method of recording information as set forth in claim 6, wherein said signal processing portion successively accepts frames of images from the video information recorded on the recording medium acting as the dubbing source in the operation (i), recognizes face images from the frames of images in the operation (ii), displays the recognized face images on the display portion in the operation (iii), registers face images which are selected from the face images displayed on the display portion according to the information entered from the input portion in the step (iv), and creates thumbnail images from images including face images which are included in the registered face images and which have appeared as said frames of images at ratios of appearance in excess of a preset value when a dubbing instruction is given from the control portion in the operation (v).

* * * * *